Figure 1A:
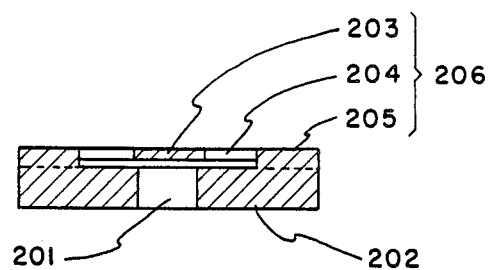

United States Patent [19]

Tsuzuki et al.

[11] Patent Number: 4,770,740
[45] Date of Patent: Sep. 13, 1988

[54] METHOD OF MANUFACTURING VALVE ELEMENT FOR USE IN AN INK-JET PRINTER HEAD

[75] Inventors: Mitsuo Tsuzuki; Michihisa Suga, both of Tokyo, Japan

[73] Assignee: NEC Corporation, Japan

[21] Appl. No.: 81,876

[22] Filed: Aug. 5, 1987

Related U.S. Application Data

[60] Division of Ser. No. 822,699, Jan. 27, 1986, abandoned, which is a continuation of Ser. No. 739,763, May 31, 1985, abandoned, which is a continuation of Ser. No. 561,633, Dec. 15, 1983, abandoned.

[30] Foreign Application Priority Data

Dec. 16, 1982 [JP] Japan ................................ 57-220593

[51] Int. Cl.⁴ .......................... B44C 1/22; C23F 1/00; B29C 37/00; C03C 15/00

[52] U.S. Cl. ..................................... 156/644; 137/517; 156/652; 156/655; 156/656; 156/659.1; 156/661.1; 156/668; 204/11; 346/140 R; 430/323; 430/324; 430/379

[58] Field of Search ............... 156/644, 652, 655, 656, 156/659.1, 661.1, 668; 137/517, 513.5, 845, 855; 346/75, 140 R, 140 A; 204/3, 9, 11; 430/323, 324, 329

[56] References Cited

U.S. PATENT DOCUMENTS 4,007,464  2/1977  Bassous et al. ........................ 346/75
4,701,766  10/1987  Sugitani et al. ...................... 346/1.1

*Primary Examiner*—William A. Powell
*Attorney, Agent, or Firm*—Laff, Whitesel, Conte & Saret

[57] ABSTRACT

A photoresist and etch method is used to manufacture valve elements of an ink jet printer. The method involves the building of successive layers upon a substrate, with the layers including conductive spacer layers which may be dissolved and plated layers that resist the dissolving. The resulting structure is a very small structure manufactured to extreme accuracy.

8 Claims, 3 Drawing Sheets

METHOD OF MANUFACTURING VALVE ELEMENT FOR USE IN AN INK-JET PRINTER HEAD

This application is a division of prior application Ser. No. 06/822,699, filed Jan. 27, 1986, abandoned, which is a continuation of Ser. No. 06/739,763, filed May 31, 1985, now abandoned, which is a continuation of Ser. No. 06/561,633, filed Dec. 15, 1983, now abandoned.

This invention relates to a micro mechanical valve, and more particularly to a valve element which is suitable for an ink-jet printer head for jetting ink droplets by the pump action caused by the interaction between electromechanical conversion means and a valve and for supplying the ink.

Conventional valve elements for ink-jet printer heads have been proposed in the U.S. patent application Ser. No. 274,210 filed on June 16, 1981, abandoned. The conventional valve element is constituted by superposing a disc-like valve seat having a cylindrical ink passage at the center with a valve element for supporting a disc-like valve at the center by arms around the valve and a ring-like fixing portion. When a pressure acts upon the valve from the side of the ink passage, the valve is pushed up and the ink flows out through the gap between the valve and the valve seat. When the pressure acts in the reverse direction, however, the valve is pushed to the valve seat, cutting the flow of the ink.

The diameter of the valve is greater than that of the ink passage and this difference is preferably as small as possible in order to facilitate the ink flow in the forward direction. This means that extremely high accuracy is necessary in superposing the valve seat and the valve component. Accordingly, the assembly of the valve element is difficult, the yield of the approved valve element is low and variance of the characteristics is great.

Moreover, the assembly method described above is not suitable for mass and economical production of a large number of valve elements.

It is, therefore, an object of this invention to provide a valve element for use in an ink-jet printer head which is suitable for mass and economical production.

According to this invention, there is provided a valve element for use in an ink-jet head comprising: a valve seat having a fine hole for a passage of a fluid, said valve seat being formed by a photoelectroforming technique; a valve for covering said hole; a support portion for supporting said valve and for displacing said valve in response to the pressure of said fluid; and a fixing portion for fitting said support portion to said valve seat, said vale, support portion and fixing portion being formed on said valve seat by the photoelectroforming technique in order to integrate said valve seat, valve, support portion and fixing portion.

Figure 1B:
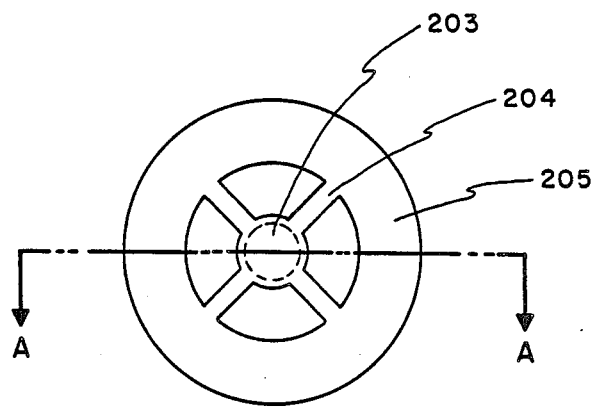
Figure 2A:
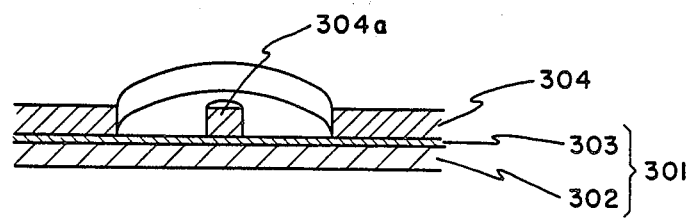
Figure 2B:
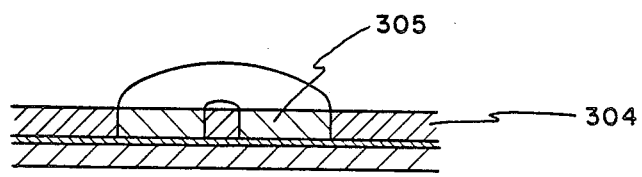
Figure 2C:
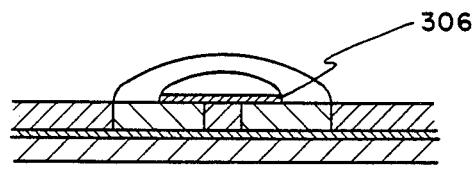
Figure 2D:
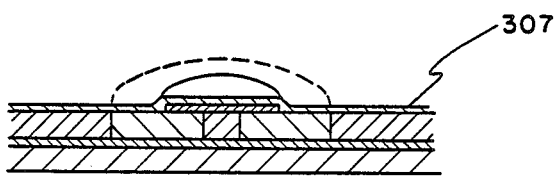
Figure 2E:
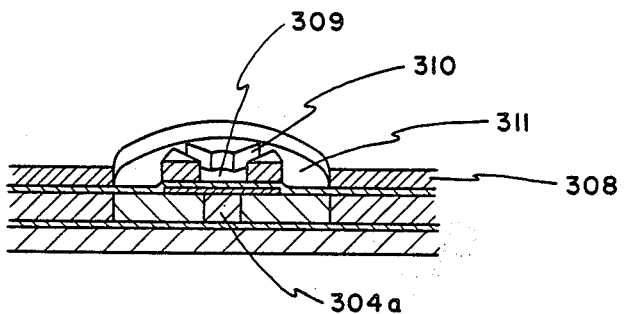
Figure 2F:
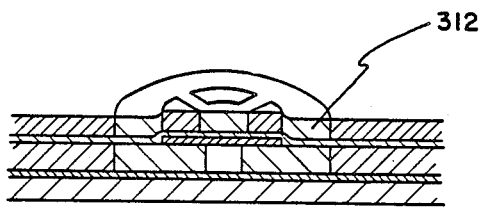
Figure 2G:
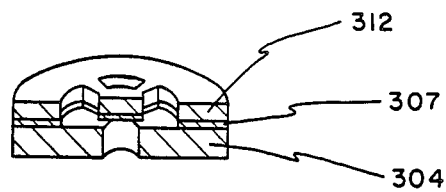
Figure 3A:
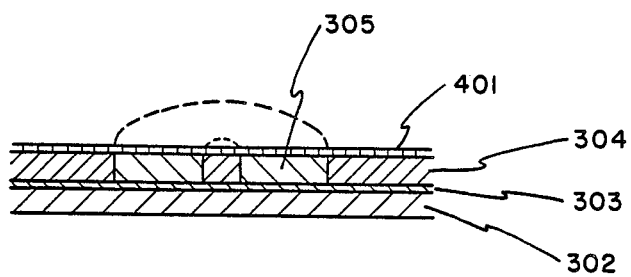
Figure 3B:
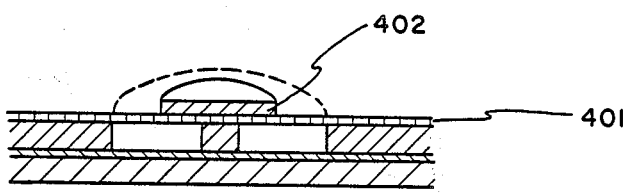
Figure 3C:
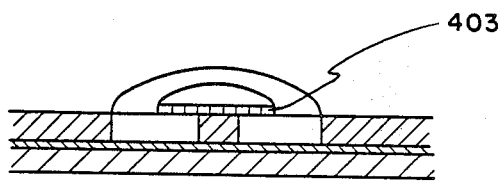

Other features and advantages of this invention will be apparent from the following description of preferred embodiments of this invention taken in conjunction with the accompanying drawings, wherein:

FIGS. 1(a) and 1(b) are a cross-sectional view and a plan view of a first embodiment of this invention, respectively;

FIGS. 2(a) to 2(g) are cross-sectional views for illustrating method of producing the valve element according to the first embodiment of this invention; and FIGS. 3(a) to 3(c) are cross-sectional views for illustrating another method of producing the valve element.

Referring to FIGS. 1(a) and 1(b), the first embodiment comprises a valve seat 202 having at its center a fluid passage 201 having a circular cross-section, a valve 203 disposed so as to shield fluid passage 201, and a valve member 206 consisting of arms 204 supporting the valve 203 and a fixing portion 205. The valve member 206 is fixed to the valve seat 202 by the fixing portion 205. On the other hand, the valve 203 and the arms 204 are separated from the valve seat 202.

The planar shape of the valve member 206 may be arbitrary. FIG. 1(a) shows a typical example in which the valve 203 is formed concentrically at the center of the ring-like fixing portion 205 and four arms 204 for supporting the valve 203 are disposed in the crisscross form. The diameter of the valve 203 is greater than that of the fluid passage 201. The valve seat 202 and the valve member 206 are formed by means of photoelectroforming technique as the combination of a patterning technique using a photoresist and plating technique, and corrosion-resist metals such as nickel, gold, chromium and the like are suitable as the metallic material. Since the valve member 206 is formed on the valve seat 202 using the same material by the photoelectroforming technique, the valve seat and the valve member become a unitrary structure. Even if the valve seat 202 and the valve member 206 are formed by different materials, the valve seat and the valve member will not separate from each other if a combination providing high bonding power at the fixing portion is used.

In the first embodiment, an example of the size of the valve element suitable for an ink-jet printer head is as follows:

diameter of fluid passage 201: 180 μm diameter of valve 203: 200 μm (provided that the valve member is made of nickel)

width of support arm 204: 50 μm length of support arm 204: 400 μm thickness of valve member 206: approx. 10 μm.

Referring to FIGS. 2(a) to 2(g), the valve element according to the first embodiment is produced in accordance with the following production process: As shown in FIG. 2(a), a substrate 301 is formed by forming a conductive layer 303 on one surface of a glass sheet 302 by vacuum deposition. The conductive layer must be one that can be selectively etched against a material forming the valve element. Since the valve element is made of nickel in the first embodiment, the conductive layer consists of an aluminum layer and of a nickel layer from the side of the glass sheet 302. The nickel layer is a protective layer for the aluminum layer when plating is effected in a subsequent step. Hence, no problem occurs even if the aluminum layer alone is used. There is no particular limitation to the thickness of the aluminum layer and it ranges from several hundreds to several thousands of angstroms. However, a greater thickness is preferred because the aluminum layer is molten in the last step. The thickness of the nickel is from dozens to hundreds of angstroms and is preferably as thin as possible within the range in which it can protect the aluminum layer.

A photoresist layer 304 is formed on the substrate 301 described above. The pattern of the valve seat is exposed to light and a pattern having the conductive layer 303 exposed in the shape of the valve seat is formed by development. The thickness of the photoresist layer is equal to that of the valve seat to be formed. In this embodiment, 20 to 60 μm-thick resist is used. After the substrate is thus patterned by photoresist, the portion of the substrate devoid of the resist is plated by electroplating as shown in FIG. 2(b), thereby forming the valve seat 305. Here, nickel is plated using a nickel sulfaminate bath. The thickness of the plating needs to be equal to that of the resist layer 304 and the difference of the thickness is preferably within ±5 μm.

Next, a spacer 306 is formed at the center as shown in FIG. 2(c). This is to be removed in the final step and is formed so as to separate the valve 203 and the arms 204 from the valve seat.

Then, a conductive layer 307 for effecting next electroplating is formed over the entire surface as shown in FIG. 2(d). It is preferably made of the same metal as the valve seat and this embodiment uses vacuum deposited nickel. Alternatively, the nickel film can by formed by non-electrolytic nickel plating, for example. The pattern of the valve member consisting of the valve 309, the arms 310 and the fixing portion 311 is formed on the conductive layer 307 by the photoresist 308. The pattern 309 of the valve in this case is formed in such a manner as to cover the resist pattern 304a of the hole of the valve seat. Since this can be made by mask registration at the time of exposure of the photoresist, the registration accuracy can be remarkably improved in comparison with the conventional method in which the valve seat and the valve member are produced individually and are then superposed.

Among the pattern of the valve member, the spacer 306 does not exist below the fixing portion 311. Next the valve member 312 is nickel-plated by electroplating as shown in FIG. 2(f). The thickness of plating in this case may be irrelevant to the thickness of the resist layer 308 and can be determined in accordance with the fluid resistance value in the forward direction of the value. It may be about 10 μm, for example.

Finally, the conductive layer 303, the resist layers 304 and 308, and the spacer 306 are dissolved, providing the valve element as shown in FIG. 2(g). Since the conductive layer 303 is formed by aluminum, it can be selectively dissolved with respect to nickel that forms the valve element, by use of sodium hyroxide. A solution that does not dissolve nickel but does the resist is used for the resist layers. In this step, if dissolution does not proceed because the surface of the spacer 306 is covered with the nickel conductive layer 307, the conductive layer 307 is etched and removed by an acid, whereby the spacer 306 appears on the surface and can be dissolved.

Next, the second embodiment of the production method of this invention will be explained with reference to FIGS. 3(a) to 3(c). The embodiment shown in FIGS. 3(a) to 3(c) is different from the first production method in forming the spacer. In other words, the steps till the formation of the valve seat in FIG. 2(b) are followed in the same way. Next, to form the spacer, an aluminum layer 401 is formed by vacuum desposition or the like on the upper surface of the nickel plating layer 305 and the resist layer 304 as shown in FIG. 3(a). Next, the pattern of the portion in which the spacer is formed is formed on its surface by the photoresist 402 as shown in FIG. 3(b).

Further, the aluminum layer of the portion devoid of the resist pattern 402 is etched and removed, whereby the spacer 403 consisting of aluminum is formed as shown in FIG. 3(c). Since this spacer is electrically conductive, the step of forming the pattern of the valve member consisting of the valve, the arms and the fixing portion, that is shown in FIG. 2(e), by the photoresist can be followed as the next step. In accordance with this method, since the spacer consists of the aluminum vacuum deposition film, it can be easily removed in the final step. Moreover, since it is thin, hardly any gap occurs between the valve and the arms versus the valve seat after the spacer is removed.

Though the embodiment illustrates the case of the aluminum layer alone, a protective layer of nickel or the like may be disposed on the upper surface of the aluminum layer in the same way as the substrate if the aluminum layer is corroded by a plating solution when electroplating of the pattern of the valve member is later electroplated.

As described above, this invention makes it possible to form all of the valve seat and the valve member (valve, arms and fixing portion) forming the valve element by photoelectroforming, and to improve the dimensional accuracy of the valve element. Since locating between the fine hole of the valve seat and the valve can be made by mask registration, the position accuracy can also be improved.

Though the foregoing description deals with only one valve element, this invention can form simultaneously a large number of the valve elements of the same type on one substrate and since the accuracy of dimension and position is high, the valve elements having uniform characteristics can be mass-produced.

What is claimed is:

1. A method of producing a valve element for use in an ink-jet printer head comprising steps of:
    coating a photoresist having a predetermined thickness onto a substrate equipped with an electrically conductive layer on at least its surface and removing said photoresist of a portion to be plated, thereby forming a pattern of a valve seat having a fine hole;
    applying plating to the portion devoid of said resist so as to bury said portion by a predetermined metal to the thickness substantially equal to that of said resist, thereby forming said valve seat;
    forming, on the surface of said valve seat, a spacer at least the surface of which has conductivity, in such a manner that said spacer is positioned between a valve, support portion and said valve seat;
    forming a pattern of a valve member on said valve seat having formed thereon said spacer, by photoresist, said valve member consisting of said valve arranged so as to cover said fine hole of said valve seat and having a predetermined size and shape greater than said fine hole and said support and fixing portions for said valve;
    plating the pattern of said valve member using a predetermined metal to form said valve member; and
    removing the photoresist forming said valve seat pattern, and photoresist forming said valve member pattern and said spacer.

2. A method of producing a valve element for use in an ink-jet printer head comprising steps of:
    coating a substrate with photoresist of a predetermined thickness, said substrate having an electrically conductive layer over at least its surface, photographically removing said photoresist over a portion of said layer which is to be plated, thereby forming a pattern of a valve seat having a fine hole;
    applying plating to the pattern formed by said photoresist to bury the portion which is devoid of said resist under a predetermined metal to a thickness which is substantially equal to the thickness of said resist, thereby forming said valve seat;

forming on the surface of said valve seat a spacer having at least its surface made of a conductive material, said spacer being positioned between a valve, its support portion and said valve seat;

forming by photoresist a pattern of a valve member on said valve seat having said spacer formed thereon, said valve member comprising said valve positioned to cover said fine hole of said valve seat, said valve member having a predetermined size and shape which is greater than said fine hole and said support for fixing the position of said valve over said hole;

plating the pattern of said valve member using a predetermined metal to form said valve member; and removing the photoresist forming said valve seat pattern, said valve member pattern, and removing said spacer whereby said valve and said support are separated and spaced away from said substrate.

3. The method of claim 2 wherein said substrate comprises a conductive layer formed by a vacuum deposit over a glass sheet, said conductive layer being a material which can be etched.

4. The method of claim 3 wherein said layer comprises nickel.

5. The method of claim 3 wherein said layer comprises an aluminum layer.

6. The method of claim 5 wherein the thickness of said coating of photoresist is in the range of several hundreds to several thousands of angstroms.

7. The method of claim 6 and a thin layer of nickel over said aluminum layer.

8. The method of claim 2 wherein said pattern comprises a central plate having a plurality of spoke like arms extending to a rim portion which is concentric to said plate.

* * * * *